(12) United States Patent
Shao et al.

(10) Patent No.: US 8,755,302 B2
(45) Date of Patent: Jun. 17, 2014

(54) METHOD AND SYSTEM FOR AD-HOC COMMUNICATIONS OVER MILLIMETER WAVE WIRELESS CHANNELS IN WIRELESS SYSTEMS

(75) Inventors: Huai-Rong Shao, San Jose, CA (US); Ju-Lan Hsu, Saratoga, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 12/821,076

(22) Filed: Jun. 22, 2010

(65) Prior Publication Data

US 2011/0069636 A1 Mar. 24, 2011

Related U.S. Application Data

(60) Provisional application No. 61/245,523, filed on Sep. 24, 2009.

(51) Int. Cl.
*H04W 48/16* (2009.01)

(52) U.S. Cl.
USPC ........... 370/254; 370/338; 370/328; 370/329; 455/515; 455/41.2; 455/187.1

(58) Field of Classification Search
USPC ......... 455/515, 41.2; 370/254, 249, 329, 338, 370/328
See application file for complete search history.

(56) References Cited

U.S. PATENT DOCUMENTS

| | | | |
|---|---|---|---|
| 7,463,592 B2 | 12/2008 | Poncini et al. | |
| 7,860,038 B2 * | 12/2010 | Abhishek et al. | 370/311 |
| 8,135,400 B2 * | 3/2012 | Shao et al. | 455/434 |
| 2003/0078062 A1 * | 4/2003 | Burr | 455/502 |
| 2005/0165946 A1 * | 7/2005 | Stephens | 709/233 |
| 2006/0142034 A1 * | 6/2006 | Wentink et al. | 455/515 |
| 2007/0070937 A1 * | 3/2007 | Demirhan et al. | 370/328 |
| 2007/0091825 A1 | 4/2007 | Budampati et al. | |
| 2007/0104138 A1 | 5/2007 | Rudolf et al. | |
| 2007/0171910 A1 | 7/2007 | Kumar | |
| 2008/0085690 A1 * | 4/2008 | Shnayderman | 455/187.1 |
| 2008/0175199 A1 * | 7/2008 | Shao et al. | 370/329 |
| 2009/0031365 A1 * | 1/2009 | Kwon et al. | 725/81 |

OTHER PUBLICATIONS

LG Electronics Inc. et al., "WirelessHD Specification Version 1.0 Overview, Chapters 3.1 and 7.2.1-7.2.4", LG Electronics Inc. et al., Oct. 9, 2007, pp. 8-9 and 25-26, United States, http://www.wirelesshd.org/pdfs/WirelessHD_Full_Overview_071009.pdf.

(Continued)

*Primary Examiner* — Man Phan
*Assistant Examiner* — Mewale Ambaye
(74) *Attorney, Agent, or Firm* — Kenneth L. Sherman, Esq.; Michael Zarrabian, Esq.; Sherman & Zarrabian LLP

(57) ABSTRACT

A method and system for wireless data communication for peer wireless stations in a network is provided. A pair of peer wireless stations perform discovery on a predefined wireless communication channel to discover each other. Upon peer wireless stations successfully discovering one another, a wireless communication channel is selected to setup a connection between the peer wireless stations for data communication on the selected wireless communication channel. The peer wireless stations then perform connection setup and data communication over the selected wireless channel. In one implementation, the network comprises a wireless local area network (WLAN) for ad-hoc Independent Basic Service Set (IBSS) peer-to-peer communication. Further, the peer wireless stations conduct millimeter wave (mmWave) directional data transmissions between the peer wireless stations on the selected wireless data communication channel.

35 Claims, 4 Drawing Sheets

(56) References Cited

OTHER PUBLICATIONS

IEEE Computer Society, "IEEE Std 802.11™-2007 (Revision of IEEE Std 802.11-1999), IEEE Standard for Information technology—Telecommunications and information exchange between systems—Local and metropolitan area networks—Specific requirements, Part 11: Wireless LAN Medium Access Control (MAC) and Physical Layer (PHY) Specifications, Chapter 11: MLME", IEEE, Jun. 12, 2007, pp. 419-468, New York, United States.

Notification of Transmittal of the International Searching Authority, International Search Report and Written Opinion dated Jun. 21, 2011 for International Application No. PCT/KR2010/006498, pp. 1-9, Korean Intellectual Property Office, Seo-gu, Daejeon, Republic of Korea.

IEEE Computer Society, "IEEE P802.15.3c/D02 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, 2008, pp. i-192, New York, United States.

* cited by examiner

METHOD AND SYSTEM FOR AD-HOC COMMUNICATIONS OVER MILLIMETER WAVE WIRELESS CHANNELS IN WIRELESS SYSTEMS

RELATED APPLICATION

This application claims priority from U.S. Provisional Patent Application Ser. No. 61/245,523 filed on Sep. 24, 2009, incorporated herein by reference.

FIELD OF THE INVENTION

The present invention relates in general to wireless communication, and in particular, to ad-hoc communications in wireless networks.

BACKGROUND OF THE INVENTION

IEEE 802.15.3c specification provides infrastructure mode communication on a wireless communication channel such as wireless radio frequency (RF) channel. For transmission between two wireless devices (e.g., wireless handheld devices), one of the wireless devices must act as a coordinator and periodically send out beacons. The other wireless device then must scan all channels and then associate with the coordinator before actual data transmission. Further, according to IEEE 802.11 IBSS (Independent Basic Service Set) mode, a wireless device in a wireless network scans all channels before it joins an IBSS and all wireless devices in the network send out beacons using random access channel utilization.

BRIEF SUMMARY OF THE INVENTION

Embodiments of the invention provide a method and system for wireless data communication for peer wireless stations in a network. A pair of peer wireless stations perform discovery on a predefined wireless communication channel to discover each other. Upon peer wireless stations successfully discovering one another, a wireless communication channel is selected to setup a connection between the peer wireless stations for data communication on the selected wireless communication channel. The peer wireless stations then perform connection setup and data communication over the selected wireless channel. In one embodiment, the network comprises a wireless local area network (WLAN) for ad-hoc Independent Basic Service Set (IBSS) peer-to-peer communication. Further, the peer wireless stations conduct millimeter wave (mmWave) directional data transmissions between the peer wireless stations on the selected wireless data communication channel.

These and other features, aspects and advantages of the present invention will become understood with reference to the following description, appended claims and accompanying figures.

DETAILED DESCRIPTION OF THE INVENTION

Embodiments of the present invention provide ad-hoc Media Access Control (MAC) protocols for Peer-to-Peer (P2P) applications (Independent Basic Service Set (IBSS) MAC) in wireless communication systems. Specifically, one embodiment of the present invention for a wireless local area network (WLAN) provides device discovery, wireless channel selection and wireless data communication schemes to support ad-hoc mode communication over millimeter wave (mmW) wireless for wireless devices such as wireless handheld devices.

To reduce device discovery time for wireless communication between two wireless devices, instead of scanning all wireless channels first at each device, the two devices directly decide on a wireless control channel (i.e., a predefined or default channel) based on a common reference number shared by two devices in which the two wireless devices discover each other first. In one example, the common reference number may be based on world time, which the two wireless devices independently have access to.

After discovering each other at the predefined wireless channel successfully, in one embodiment, the two wireless devices can utilize the predefined wireless channel, or switch to other wireless channels, for channel scanning in a coordinated manner. If another wireless channel (e.g., one more desirable than the predefined channel) is detected, the two wireless devices select the other channel. After wireless channel selection, the two wireless devices switch to the selected channel to perform connection setup and data transmission on the selected channel. No beacons are required.

In a wireless communication system including multiple wireless devices (e.g., wireless transmitter and/or receiver devices such as wireless stations) according to an embodiment of the invention, a superframe structure is used for data transmission between wireless devices. For example, using the IEEE 802.11 standard, a superframe structure (marked by beacons frames) is used in a Media Access Control (MAC) layer and a physical (PHY) layer. In a wireless transmitter, a MAC layer receives a MAC Service Data Unit (MSDU) from higher layers and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a wireless receiver, a preamble is attached to the PPDU, wherein the preamble can include channel estimation and synchronization information.

Figure 1:
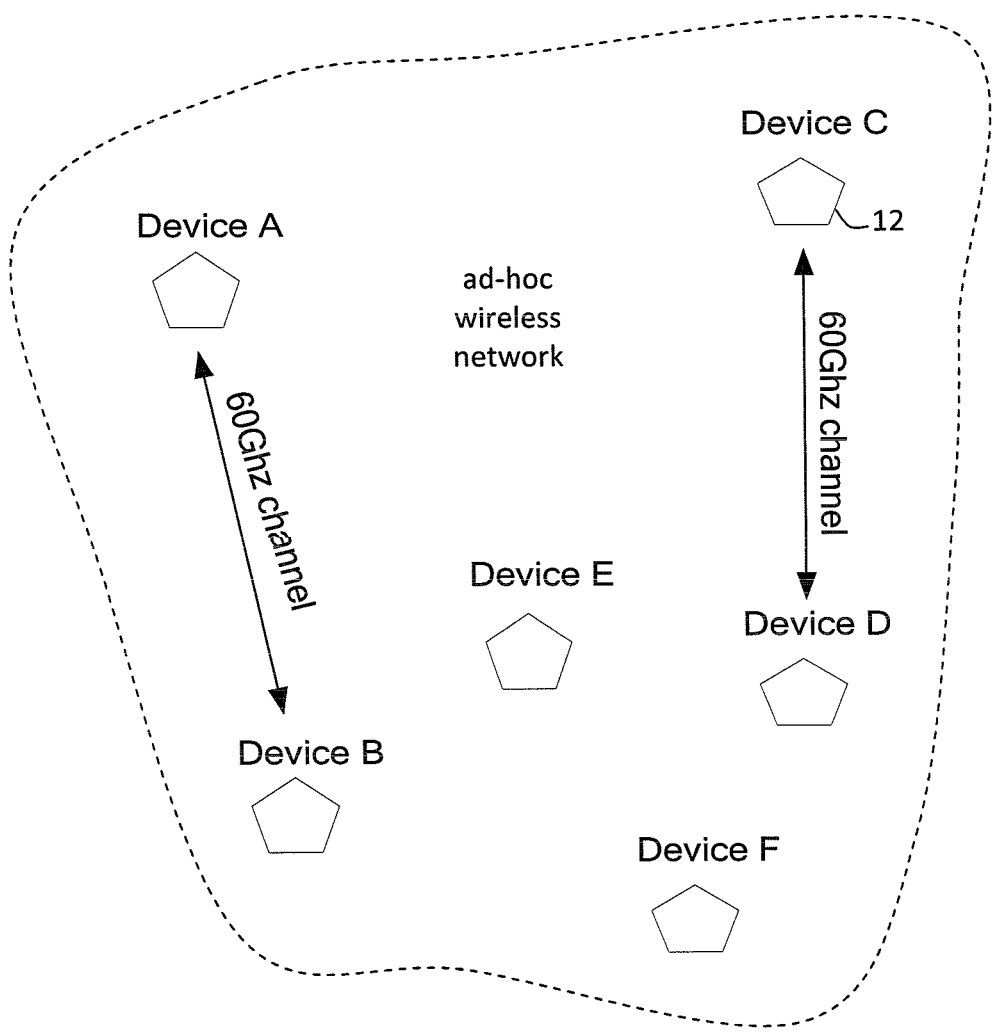
FIG. 1 shows a block diagram of a wireless communication system comprising a network of wireless stations configured for engaging in peer-to-peer ad-hoc communication, according to an embodiment of the invention.

FIG. 1 shows an example wireless system 10 including multiple wireless devices 12 (wireless transceiver stations Device A, Device B, Device C, Device D, Device E, Device F), according to an embodiment of the invention. The network 10 provides ad-hoc MAC protocols for Peer-to-Peer (P2P)

applications (IBSS MAC). In this embodiment, all wireless devices 12 operate in ad-hoc transmission mode (i.e., there is no coordinator to manage the wireless devices within the transmission range with each other). Multiple wireless transmissions can share the same 60 GHz radio frequency (RF) channel simultaneously by using directional transmission (e.g., beamforming) at the same wireless channel to avoid interference.

If the directional transmission from a wireless Device A to a wireless Device B does not interfere with the directional transmission from a wireless Device C to a wireless Device D, then said devices A, B, C, D can use the same wireless channel simultaneously for directional wireless communication between Devices A, B and directional wireless communication between devices C, D.

For wireless transmission between two wireless devices, an initiator indicates a wireless device which first initiates a wireless transmission. The initiator can be the transmission sender or the receiver. A transmission responder indicates a wireless device which responds to the transmission initiator. Similarly, the responder can be the transmission sender or the receiver.

Device Discovery

According to an embodiment of the invention, in the wireless network 10, in order to reduce device discovery time for wireless communication between two wireless devices 12, instead of scanning all wireless channels first at each wireless device, the two wireless devices directly decide on a default control channel based on a common reference number shared by two devices (e.g., world time). The two wireless devices then use the default channel to discover each other first. If the two wireless devices cannot find each other at the default channel, then they scan at other wireless channels using a predefined order to select a channel for performing device discovery.

A first wireless device scans the default wireless channel first. If it cannot find its partner wireless device, when the identity of the partner wireless device is already known, or in case of very short range wireless communication only the partner can be reached, then the first wireless device switches to other channels in a predefined order to search for its partner wireless device.

According to an embodiment of the invention, considering the short range transmission characteristics between two wireless handheld devices, in most cases a wireless device can find its partner at the default channel. The overall discovery time is reduced in most cases since a wireless device need not scan all channels.

According to an embodiment of the invention, instead of always passively scanning a channel for a long duration, a wireless device actively transmits a Ping Request to its partner wireless device using a random channel access control scheme such as Carrier Sensing Multiple Access (CSMA). As such, device discovery duration can be further reduced.

According to an embodiment of the invention, the default channel and the channel scanning order may be selected in different ways. In one example, if two wireless devices support world time and attempt scanning at a similar time, the two wireless devices can select the same wireless channel to start scanning using the Hour plus Minute format as the base number, and then dividing the base number by the total number of channels to obtain a channel number to be selected.

According to an embodiment of the invention, the wireless devices continue scanning on a channel (e.g., a default channel or a first selected channel) until a timeout threshold, so long as the channel is not always busy, such that a wireless device obtains at least one transmit opportunity (TxOP), for a maximum beacon interval time (MaxBITime). The value MaxBITime is the maximum duration of a superframe, i.e., the maximum time between two neighboring beacons. Scanning continues for MaxBITime wherein MaxBITime is the timeout threshold. In another example, the two wireless devices can set the channel in which most countries in the world allow by regulation, as the default channel.

According to an embodiment of the invention, for mmW wireless device discovery, an mmW wireless device listens on a channel at a predefined Quasi-omni direction and uses IEEE 802.11 DCF (Distributed Coordination Function) mode to transmit Ping Request frames (Simplified Probe Request) with Control PHY mode. If the mmW wireless device receives a Ping Request frame, it stops transmitting Ping Request frames and uses DCF to transmit a Ping Response frame (Simplified Probe Response) with Control PHY mode. The ping request and response frames facilitate the mmmW wireless device discovery process according to an embodiment of the invention.

Figure 2A:
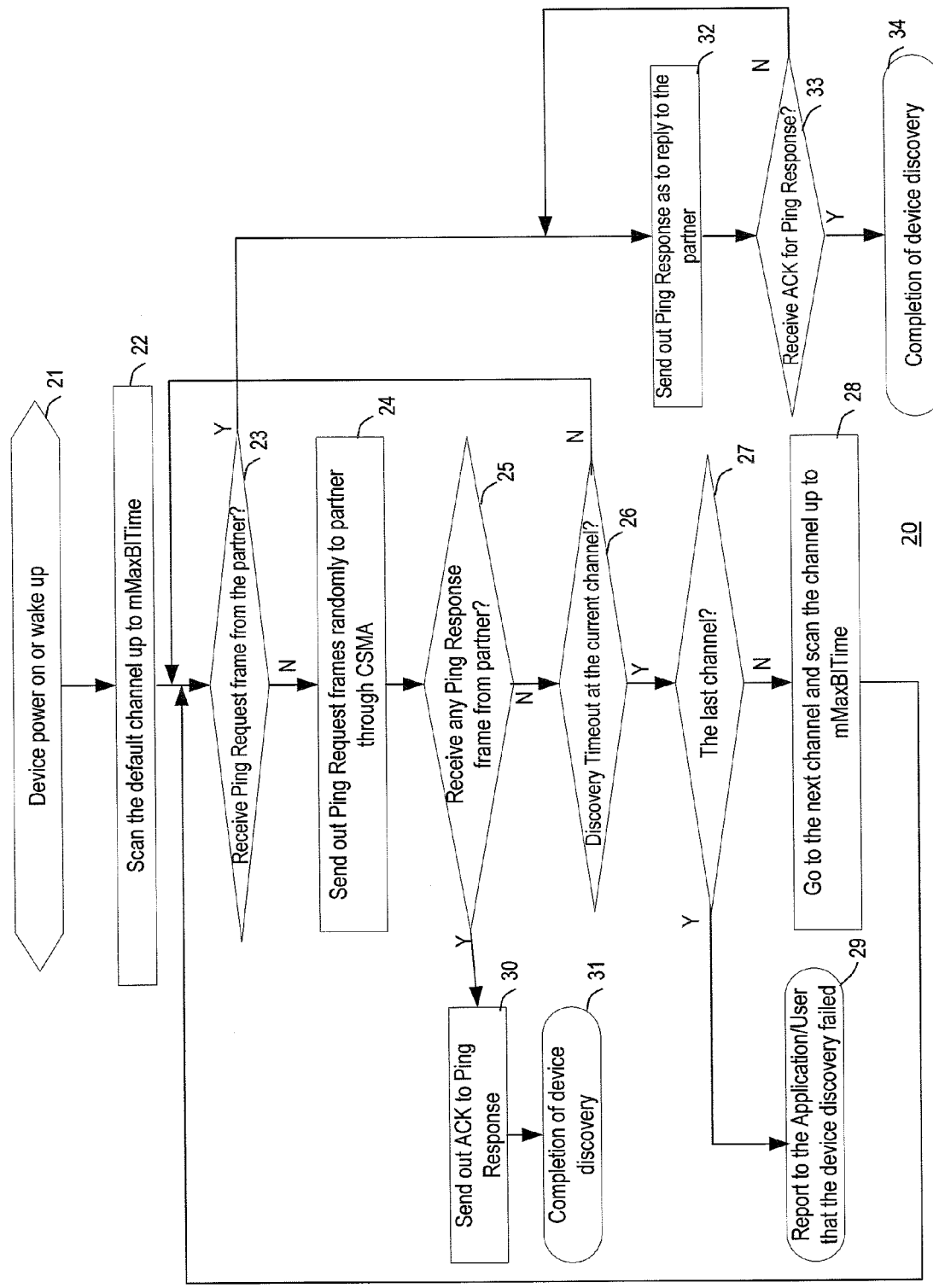
FIG. 2A shows a flowchart of a device discovery process for peer-to-peer ad-hoc communication between peer wireless stations, according to an embodiment of the invention.

FIG. 2A illustrates a device discovery process 20 applicable to a scenario such as in FIG. 1, for ad-hoc MAC in a P2P application (IBSS MAC) between two wireless devices (P2P partners), according to an embodiment of the invention, comprising the following process blocks:

Block 21: Device power on, or wake up.
Block 22: Scan the default channel up to mMaxBITime.
Block 23: Receive Ping Request frame from the partner? If not, proceed to block 24, else proceed to block 32.
Block 24: Send out Ping Request frames randomly to the partner through CSMA.
Block 25: Received any Ping Response frame from partner? If not, proceed to block 26, else proceed to block 30.
Block 26: Discovery Timeout reached at the current channel? If yes, proceed to block 27, else proceed to block 23.
Block 27: The last available channel to scan? If yes, proceed to block 29, else proceed to block 28.
Block 28: Go to the next channel and scan the channel up to mMaxBITime. Proceed to block 23.
Block 29: Report to the Application/User that the device discovery failed. End.
Block 30: Send out ACK to a Ping Response.
Block 31: Device discovery successfully completed. End.
Block 32: Send out Ping Response as reply to the partner.
Block 33: Receive ACK for Ping Response? If yes, proceed to block 34, else proceed to block 32.
Block 34: Device discovery successfully completed. End.

According to an embodiment of the invention, for mmW wireless device discovery, an mmW wireless device listens on a channel at a predefined Quasi-omni direction and uses IEEE 802.11 DCF (Distributed Coordination Function) mode to transmit Ping Request frames (Simplified Probe Request) with Control PHY mode. If the mmW wireless device receives a Ping Request frame, it stops transmitting Ping Request frames and uses DCF to transmit a Ping Response frame (Simplified Probe Response) with Control PHY mode.

Connection Setup and Data Transmission

Figure 2B:
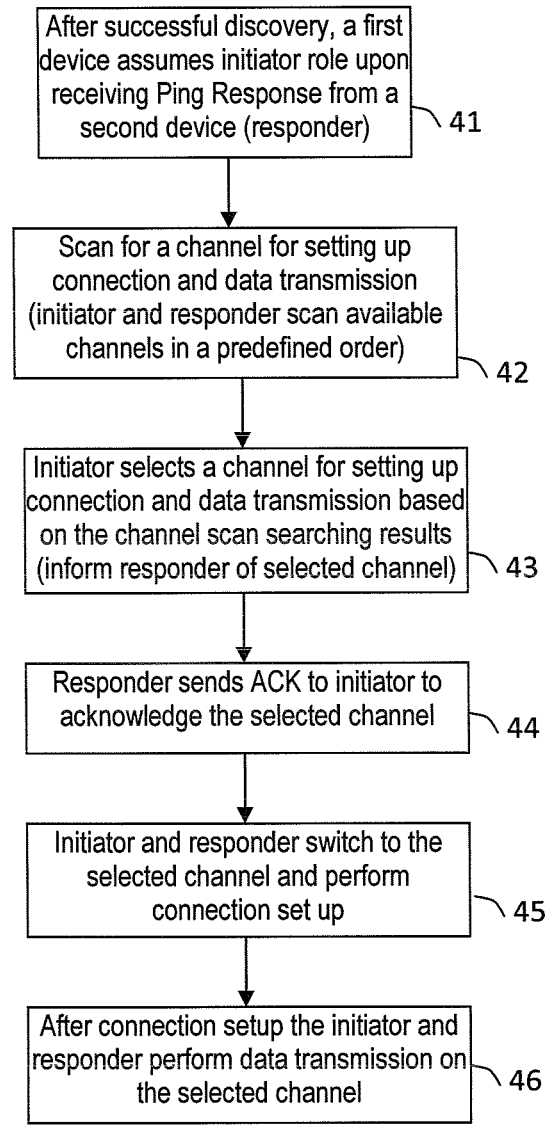
FIG. 2B shows a flowchart of a connection setup and data communication process for peer-to-peer ad-hoc communication between peer wireless stations, according to an embodiment of the invention.

FIG. 2B illustrates a connection setup and data transmission process 40 for ad-hoc MAC in a P2P application (IBSS MAC) between two wireless devices after successful device discovery, according to an embodiment of the invention. Referring to FIG. 2B, the process blocks 41-46 of the process 40 are now described. After two wireless devices successfully discover each other, the wireless device which successfully received the Ping Response becomes the Initiator and the other wireless device (i.e., sender of the Ping Response) becomes the Responder (block 41).

The two wireless devices then scan for a channel on which they setup a connection for actual data transmission (block 42). For example, if the current wireless channel (i.e., the channel used for device discovery) is busy, the initiator can request the responder to scan other channels in a predefined order by a sending Scan Request frame message, while at the same time the initiator also scans said other channels in the same predefined order. Scanning is for detecting whether the channel is free or whether the channel has free channel time if other devices are using the channel.

After completing channel scanning and receiving a Scan Response frame from the responder, the initiator decides whether to select a scanned wireless channel and switch to it, according to the scanning results (block 43). In one example, selecting a channel is based on whether the channel is free or whether the channel has free channel time if other devices are using the channel.

When the initiator selects a new wireless channel to switch to, the initiator sends a Channel Switch Request frame to the responder, providing the identity of the selected channel to switch to (block 44).

Upon receiving the Channel Switch Request frame, the responder replies to the Channel Switch Request frame with an acknowledgement (ACK) frame (block 45). After receiving an ACK frame to the Channel Switch Request frame, the initiator switches to the selected channel. At the responder, after receiving a Channel Switch Request frame from the initiator and sending out an ACK, the responder switches to the selected channel (block 45).

After a channel is selected for actual data transmission, further control frames may be exchanged between the initiator and responder. For example, antenna training messages can be exchanged for beamforming communication in a known manner. The antenna training procedure is to determine the transmission and receiving directions between two wireless devices. The control messages during antenna training procedure may be transmitted omni-directional or directional depending on the stage of the antenna training. In addition, Transmit Power Control (TPC) procedures may be performed.

According to an embodiment of the invention, after two wireless devices (the initiator and the responder) successfully discover each other and setup a connection at a selected (desirable) channel (e.g., a channel with acceptable link quality), the wireless devices can commence actual data transmission via directional transmissions such as beamforming transmissions (block 46). A transmitting wireless device can simply use DCF to access the selected channel and transmit packets with an ACK policy. A receiving wireless device may report channel conditions periodically in order to maintain the link quality.

According to an embodiment of the invention, when beamforming transmissions are used, channel condition can be reported via Beam tracking procedures. Beam-tracking information is used to fine-tune the beamforming parameters at both the initiator and the responder to maintain link quality for beamforming transmission despite dynamic changes in the environment. If continuous collision or interference is detected, the initiator may start a channel switching process or Beam searching procedure if supported. Beam-searching is used to search for transmission beams and adjust beamforming parameters. Periodical beam-searching can also be performed.

Connection Tear Down

According to an embodiment of the invention, both the initiator and the responder can tear down a connection through Disconnect Request/Response exchange procedure (e.g., IEEE 802.15.3 and IEEE 802.11 exchange procedures).

Embodiments of the present invention do not require that at least one of the two wireless devices engaged in P2P wireless communication function as a coordinator, and therefore no master-slave requirement is needed. Embodiments of the present invention do not require beacon capability for all the wireless devices (i.e., no beacon at all or ad-hoc beacon by any peer (beacon is very short)).

Further, according to embodiments of the present invention, channel scan mode for device discovery involves active channel scanning is on predefined channel(s) only. Channel selection for data communication is performed after device discovery. Connection setup in P2P communication topology is directly between peers (i.e., partners such as an initiator and a responder) utilizing directional transmissions therebetween. Data transmission is based on DCF.

Embodiments of the present invention fulfill three specific technical requirements for the ad-hoc MAC protocol for targeted applications, including: reduced MAC control overhead, reduced communication power consumption and efficient device discovery and connection setup. One embodiment facilitates Sync 'n' Go (also known as Sync-and-Go) file transmission between two wireless electronic devices such as wireless handheld devices.

Figure 3:
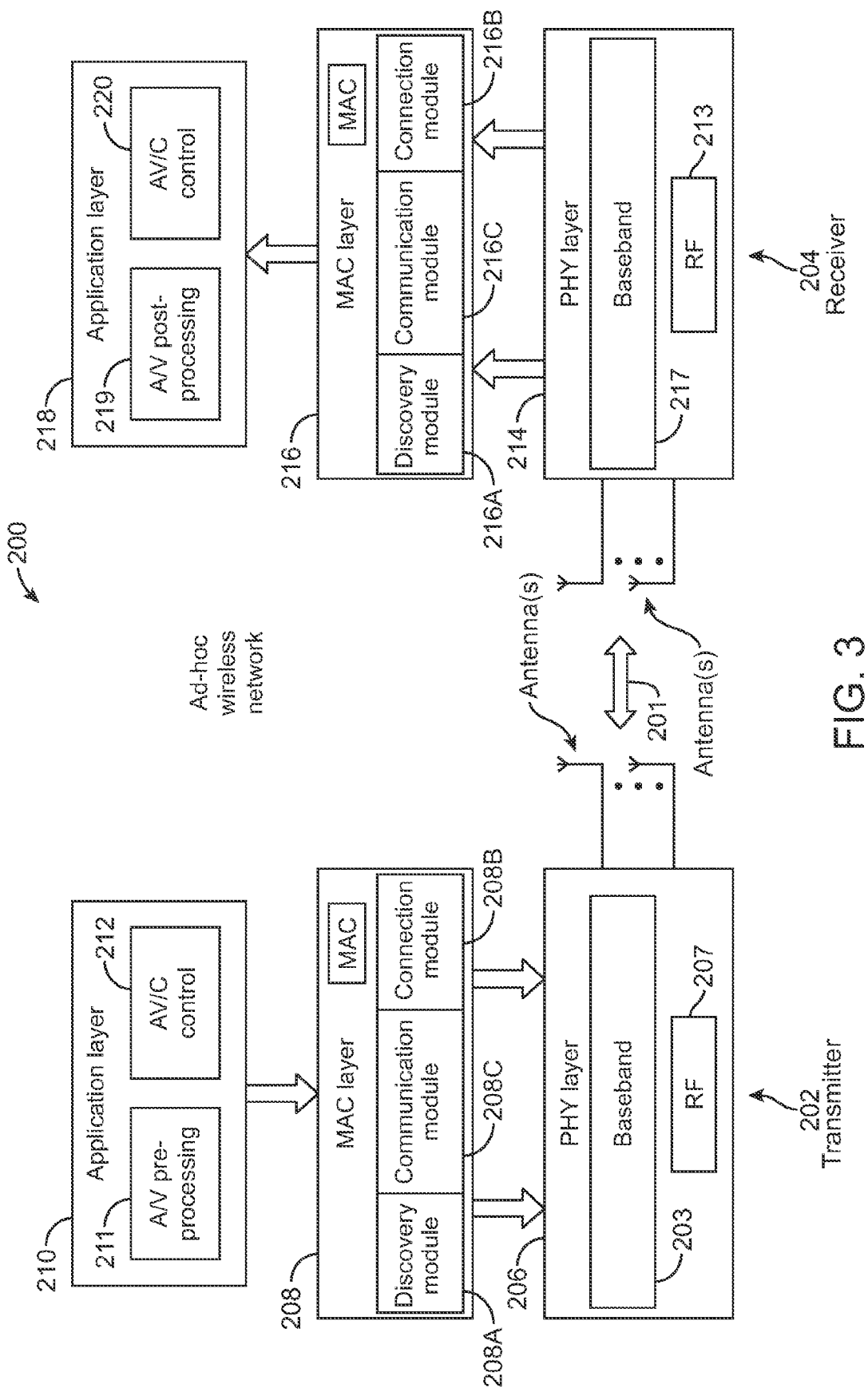
FIG. 3 shows a block diagram of a wireless network of wireless devices configured for engaging in peer-to-peer ad-hoc communication, according to an embodiment of the invention.

FIG. 3 shows a block diagram of an example wireless communication system 200, implementing an embodiment of the present invention. The system 200 includes wireless stations or wireless devices such as a wireless transmitter station 202 and wireless receiver station 204, for data transmission, such as transmission of data, audio/video information. The devices 202 and 204 engage in P2P ad-hoc communications over wireless channel(s) 201. The devices 12 in network 10 of FIG. 1 are examples of wireless stations 202, 204, in the system 200 of FIG. 3.

The sender 202 includes a PHY layer 206, a MAC layer 208 and an application layer 210. The PHY layer 206 includes a radio frequency (RF) communication module 207 which transmits/receives signals under control of a baseband process module 203. The baseband module 203 allows communicating control information and video information.

The application layer 210 includes an audio/visual (A/V) pre-processing module 211 for packetizing video streams, which are then converted to MAC packets by the MAC layer 208. The application layer 210 further includes an AV/C control module 212 which sends stream transmission requests and control commands to reserve channel time blocks for transmission of packets.

The receiver 204 includes a PHY layer 214, a MAC layer 216 and an application layer 218. The PHY layer 214 includes a RF communication module 213 which transmits/receives signals under control of a baseband process module 217. The application layer 218 includes an A/V post-processing module 219 for de-packetizing into streams the video information in the MAC packets, received by the MAC layer 216. The de-packetizing is reverse of the packetization. The application layer 218 further includes an AV/C control module 220 which handles stream control and channel access. Beamforming transmissions may be performed over multiple channels. The MAC/PHY layers may perform antenna training and beaming switching control.

An example application of the system 200 in FIG. 3 is for millimeter wave (mmWave or mmW) wireless such as 60 GHz frequency band wireless networks. For each of STAs 202, 204, the invention may be implemented in their respective MAC layers. For example, the MAC layer 208 of the transmitter 202 includes a discovery module 208A configured for device discovery described above, a connection module 208B configured for connection setup and tear down as described above, and a communication module 208C configured for data communication via beamforming as described above. Further, the MAC layer 216 of the transmitter 204 contains a discovery module 216A configured for device discovery described above, a connection module 216B configured for connection setup and tear down as described above, and a communication module 216C configured for data communication via beamforming as described above.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of data communication in a wireless communication system, comprising:
a pair of peer wireless stations performing discovery on a predefined wireless communication channel to discover each other;
deciding on the predefined wireless communication channel for wireless station discovery as a default control channel that is based on a common reference number comprising current world time shared by the pair of peer wireless stations, and a total number of available channels, wherein each of the pair of peer wireless stations directly decides on the default control channel to start scanning utilizing a base number based on a time format;
upon the pair of peer wireless stations successfully discovering one another, selecting a wireless communication channel based on the base number to setup a connection between the pair of peer wireless stations for data communication on the selected wireless communication channel, wherein the selected wireless communication channel is determined based on using the time format as the base number, and dividing the base number by the total number of available channels.

2. The method of claim 1, wherein:
the common reference number is based on current world time which the pair of peer wireless stations both have direct access to order.

3. The method of claim 1, wherein performing discovery on the predefined wireless communication channel further comprises:
each peer wireless station scanning the predefined wireless communication channel for a timeout period to discover one another;
after the timeout period, upon the pair of peer wireless stations not discovering one another on the predefined wireless communication channel, the pair of peer wireless stations scanning other wireless communication channels using a predefined order to select a wireless communication channel for performing device discovery, wherein the pair of peer wireless stations scan each wireless communication channel for the timeout period.

4. The method of claim 1, wherein:
selecting a wireless communication channel to setup a connection further comprises the pair of peer wireless stations performing channel scanning for selecting the wireless communication channel to setup a connection for data communication on the selected wireless communication channel.

5. The method of claim 4, wherein performing channel scanning further comprises:
upon detecting that the predefined wireless communication channel is busy for a time period, one of the pair of peer wireless stations as an initiator station requesting the other peer wireless station as a responder station to scan other wireless communication channels in a predefined order by sending a message, while at the same time the initiator station scanning said other wireless communication channels in the predefined order.

6. The method of claim 5, further comprising: the initiator station selecting a wireless communication channel among the scanned wireless communication channels and informing the responder station; the initiator station and the responder station switching to the selected wireless communication to setup a connection for data communication there between on the selected wireless communication channel.

7. The method of claim 6, wherein the wireless communication system comprises a wireless local area network (WLAN) for ad-hoc Independent Basic Service Set (IBSS) peer-to-peer communication.

8. The method of claim 7 further comprising:
conducting millimeter wave (mmWave) directional data transmissions between the pair of peer wireless stations on the selected wireless communication channel.

9. A wireless communication system, comprising:
a pair of peer wireless stations;
each wireless station comprising:

a discovery module configured for performing discovery on a predefined wireless communication channel to discover each other, wherein the predefined wireless communication channel comprises a default control channel that is based on a common reference number comprising current world time that is shared by the pair of peer wireless stations, and a total number of available channels, wherein each of the pair of peer wireless stations directly decides on the default control channel to start scanning utilizing a base number based on a time format;

a connection module configured for, upon successful discovery, selecting a wireless communication channel based on the base number to setup a connection between the pair of peer wireless stations for data communication on the selected wireless communication channel wherein the selected wireless communication channel is determined based on using the time format as the base number, and dividing the base number by the total number of available channels.

10. The system of claim 9, wherein:
the pair of peer wireless stations have access to the current world time.

11. The system of claim 9, wherein each discovery module is further configured for:
scanning the predefined wireless communication channel for a timeout period to discover one another;
after the timeout period, upon the pair of peer wireless stations not discovering one another on the predefined wireless communication channel, then scanning other wireless communication channels using a predefined order to select a wireless communication channel for performing device discovery, wherein the pair of peer wireless stations scan each wireless communication channel for the timeout period.

12. The system of claim 9, wherein each connection module is further configured for:
selecting a wireless communication channel to setup a connection for data communication by performing channel scanning.

13. The system of claim 12, wherein each connection module is further configured for:
upon detecting that the predefined wireless communication channel is busy for a time period, one of the pair of peer wireless stations as an initiator station requesting the other peer wireless station as a responder station to scan other wireless communication channels in a predefined order by sending a message, while at the same time the initiator scanning said other wireless communication channels in the predefined order.

14. The system of claim 13, wherein each connection module is further configured for: the initiator station selecting a wireless communication channel among the scanned wireless communication channels and informing the responder station; and the initiator station and the responder station switching to the selected wireless communication to setup a connection for data communication there between on the selected wireless communication channel.

15. The system of claim 14, wherein the wireless communication system comprises a wireless local area network (WLAN) for ad-hoc Independent Basic Service Set (IBSS) peer-to-peer communication.

16. The system of claim 15, wherein:
each peer wireless station further comprising a communication module configured for conducting millimeter wave (mmWave) directional data transmissions between the pair of peer wireless stations on the selected wireless data communication channel comprising a 60 GHz radio frequency channel.

17. A wireless station for communication with a peer wireless station, comprising:
a discovery module configured for performing discovery on a predefined wireless communication channel to discover a peer wireless station, wherein the predefined wireless communication channel comprises a default control channel that is based on a common reference number comprising current world time that is shared by the peer wireless stations, and a total number of available channels, wherein each of the peer wireless stations directly decides on the default control channel to start scanning utilizing a base number based on a time format;

a connection module configured for, upon successful discovery, selecting a wireless communication channel based on the base number to setup a connection between the peer wireless stations for data communication on the selected wireless communication channel wherein the selected wireless communication channel is determined based on using the time format as the base number, and dividing the base number by the total number of available channels.

18. The wireless station of claim 17, wherein:
the peer wireless stations have access to current world time.

19. The wireless station of claim 17, wherein the discovery module is further configured for: scanning the predefined wireless communication channel for a timeout period to discover one another; after the timeout period, upon the peer wireless stations not discovering one another on the predefined wireless communication channel, then scanning other wireless communication channels using a predefined order to select a wireless communication channel for performing device discovery, wherein the discovery module scans each wireless communication channel for the timeout period.

20. The wireless station of claim 17, wherein the connection module is further configured for:
selecting a wireless communication channel to setup a connection for data communication by performing channel scanning.

21. The wireless station of claim 20, wherein the connection module is further configured for:
upon detecting that the predefined wireless communication channel is busy for a time period, the wireless station as an initiator station requesting the peer wireless station as a responder station to scan other wireless communication channels in a predefined order by sending a message, while at the same time the initiator station scanning said other wireless communication channels in the predefined order.

22. The wireless station of claim 21, wherein the connection module is further configured for: the initiator station selecting a wireless communication channel among the scanned wireless communication channels and informing the responder station; and the initiator station and the responder station switching to the selected wireless communication to setup a connection for data communication there between on the selected wireless communication channel.

23. The wireless station of claim 22, wherein:
wireless station is configured for communication with the peer wireless station in a wireless local area network (WLAN) via ad-hoc Independent Basic Service Set (IBSS) peer-to-peer communication; and
the wireless station further comprises a communication module configured for conducting millimeter wave (mmWave) directional data transmissions with the peer wireless station on the selected wireless communication channel comprising a 60 GHz radio frequency channel.

24. The method of claim 1, wherein upon the pair of peer wireless stations attempt scanning at a same time, the pair of peer wireless stations select a same wireless communication channel to start scanning.

25. The method of claim 1, wherein a peer wireless station performs scanning by actively transmitting a ping request to a partner peer wireless station using a random access control scheme.

26. The method of claim 1, wherein one of the pair of peer wireless stations scans the default wireless channel for the other peer wireless station of the pair of peer wireless stations.

27. The method of claim 1, wherein the pair of peer wireless stations continue to scan on the default control channel for discovery until a timeout threshold is reached.

28. The method of claim 27, wherein one of the pair of peer wireless stations obtains at least one transmit opportunity (TxOP), for a maximum beacon interval time (MaxBlTime).

29. The method of claim 28, wherein a value of MaxBlTime is a maximum duration of a maximum time between two neighboring beacons.

30. The method of claim 29, wherein MaxBlTime is the timeout threshold.

31. The method of claim 1, wherein each of the pair of peer wireless stations attempt scanning at a same time and select a same control channel to start scanning.

32. The method of claim 1, wherein upon the pair of peer wireless stations attempt scanning at a same time, the pair of peer wireless stations select a same wireless channel to start scanning based on using an hours plus minute format as the base number.

33. The method of claim 32, further comprising dividing the base number by the total number of available channels for obtaining a channel number to use as the selected same channel.

34. The method of claim 24, wherein the time format comprises an hours plus minute format.

35. The method of claim 34, wherein the selected same wireless communication channel is determined based on using an hours plus minute format as the base number, and on dividing the base number by the total number of available channels for obtaining a channel number to use as the selected same channel.

* * * * *